United States Patent [19]

Gluntz

[11] Patent Number: 5,353,318
[45] Date of Patent: Oct. 4, 1994

[54] PRESSURE SUPPRESSION SYSTEM

[75] Inventor: Douglas M. Gluntz, San Jose, Calif.

[73] Assignee: General Electric Company, San Jose, Calif.

[21] Appl. No.: 55,997

[22] Filed: May 3, 1993

[51] Int. Cl.⁵ ............................................ G21C 15/18
[52] U.S. Cl. ........................................ 376/283; 376/299
[58] Field of Search .......................... 376/282, 283, 299

[56]          References Cited
        U.S. PATENT DOCUMENTS

| | | | |
|---|---|---|---|
| 5,008,069 | 4/1991 | Fredell | 376/299 |
| 5,059,385 | 10/1991 | Gluntz et al. | 376/282 |
| 5,082,619 | 1/1992 | Sawyer | 376/283 |
| 5,102,617 | 4/1992 | Gluntz et al. | 376/283 |
| 5,169,595 | 12/1992 | Cooke | 376/282 |

OTHER PUBLICATIONS

GE Nuclear Energy, "SBWR Technical Description for NRC Staff Presentation," Dec. 1989, pp: cover; 1.0-1; 1.2-16, 17, 19, 20 & 28; 2.3-1 thru 11, 15-18; 2.6-14 & 42.

Primary Examiner—Daniel D. Wasil
Attorney, Agent, or Firm—J. S. Beulick

[57]          ABSTRACT

A pressure suppression system includes a containment vessel surrounding a reactor pressure vessel and defining a drywell therein containing a non-condensable gas. An enclosed wetwell pool is disposed inside the containment vessel, and an enclosed gravity driven cooling system (GDCS) pool is disposed above the wetwell pool in the containment vessel. The GDCS pool includes a plenum for receiving through an inlet the non-condensable gas carried with steam from the drywell following a loss-of-coolant accident (LOCA). A condenser is disposed in the GDCS plenum for condensing the steam channeled therein and to trap the non-condensable gas therein. A method of operation includes draining the GDCS pool following the LOCA and channeling steam released into the drywell following the LOCA into the GDCS plenum for cooling along with the non-condensable gas carried therewith for trapping the gas therein.

18 Claims, 3 Drawing Sheets

PRESSURE SUPPRESSION SYSTEM

The U.S. Government has rights in this invention in accordance with Contract No. DE-AC03-90SF18494 awarded by the Department of Energy.

The present invention relates generally to nuclear reactors, and, more specifically, to pressure containment therein.

BACKGROUND OF THE INVENTION

A nuclear reactor plant includes a containment vessel surrounding a reactor pressure vessel and defining therewith a drywell which typically contains a non-condensable gas such as nitrogen. Disposed in the pressure vessel is a conventional nuclear reactor core submerged in water which is effective for heating the water to generate steam which is discharged from the pressure vessel for use in powering a steam turbine-generator for producing electrical power, for example.

Typically surrounding the pressure vessel within the containment vessel is an annular suppression pool or wetwell which serves various functions including being a heat sink during postulated accidents. For example, one type of accident designed for is a loss-of-coolant accident (LOCA) in which steam from the pressure vessel leaks therefrom into the drywell. Following the LOCA, therefore, the reactor is shut down but pressurized steam and residual decay heat continue to be generated for a certain time following the shutdown. In one conventional safety system, the pressure vessel is depressurized by discharging the steam into the wetwell for cooling and condensing and for preventing unacceptably large pressure increases within the containment vessel itself. Steam escaping into the drywell is also channeled into the wetwell through conventional drywell-to-wetwell vents, having horizontal outlets, for example, disposed therein.

Improved nuclear reactor plants are being developed to reduce or eliminate the need for AC powered safety systems following a LOCA, for example. In one design designated a Simplified Boiling Water Reactor (SBWR), a Passive Containment Cooling System (PCCS) is provided for removing heat from the containment vessel during the LOCA. One example of a PCCS is disclosed in U.S. Pat. No. 5,059,385—Gluntz et al., assigned to the present assignee, wherein the wetwell, or suppression pool, is enclosed and separated from the drywell within the containment vessel, and a Gravity Driven Cooling System (GDCS) pool is located above the wetwell within the containment vessel and is vented to the drywell. An isolation pool is disposed outside the containment vessel and above the GDCS pool and contains a heat exchanger (Passive Containment Cooling System condenser, or PCCS condenser) having an inlet disposed in flow communication with the drywell, and an outlet joined to a collector chamber from which a vent pipe extends into the wetwell and a condensate return conduit extends into the GDCS pool. The PCCS condenser provides passive heat removal from the containment drywell following the LOCA, with steam released into the drywell flowing through the inlet into the PCCS condenser wherein it is condensed. The non-condensable gas within the drywell, such as nitrogen, is carried by the steam into the PCCS condenser and must be separated therefrom to provide effective operation of the PCCS condenser. The collector chamber separates the non-condensable gas from the condensate, with the separated non-condensable gas being vented into the wetwell, and the condensate being channeled into the GDCS pool.

This system relies on the pressure difference between the drywell and the wetwell, and, therefore, a water trap is provided at the end of the condensate return conduit in the GDCS pool to restrict backflow of heated fluids from the containment vessel to the wetwell via the condensate return conduit which would bypass the PCCS condenser.

Accordingly, this system is configured to transport the non-condensable gas from the drywell to the wetwell and then condense steam from the drywell in the PCCS condenser. The non-condensable gas will remain in the enclosed wetwell until the condenser condenses steam faster than it is released from the pressure vessel. When this occurs, the PCCS condenser is effective for lowering the drywell pressure below that of the wetwell, which will cause conventional vacuum breakers joined to the wetwell to open, and allow the non-condensable gas stored in the wetwell to return to the drywell, and then this cycle will repeat.

Furthermore, the non-condensable gas within the drywell is also carried directly into the wetwell by the escaping steam which is channeled through the horizontal vents. The steam is released underwater in the wetwell and condenses therein, while the non-condensable gas is buoyed upwardly through the pool water to vent into the enclosed wetwell air chamber disposed above the pool water for its retention. As the non-condensable gas accumulates in the wetwell chamber, the pressure therein correspondingly increases. Accordingly, the overall containment pressure remains relatively high after the LOCA due to the high-pressure steam escaping into the drywell, and especially in the enclosed wetwell itself due to the accumulation of the non-condensable gas, which must be suitably accommodated by providing stronger, and therefore more expensive containment walls, for example.

SUMMARY OF THE INVENTION

A pressure suppression system includes a containment vessel surrounding a reactor pressure vessel and defining a drywell therein containing a non-condensable gas. An enclosed wetwell pool is disposed inside the containment vessel, and an enclosed gravity driven cooling system (GDCS) pool is disposed above the wetwell pool in the containment vessel. The GDCS pool includes a plenum for receiving through an inlet the non-condensable gas carried with steam from the drywell following a loss-of-coolant-accident (LOCA). A condenser is disposed in the GDCS plenum for condensing the steam channeled therein and to trap the non-condensable gas therein. A method of operation includes draining the GDCS pool following the LOCA and channeling steam released into the drywell following the LOCA into the GDCS plenum for cooling along with the non-condensable gas carried therewith for trapping the gas therein.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawing in which.

DESCRIPTION OF THE PREFERRED EMBODIMENT(S)

Figure 1:
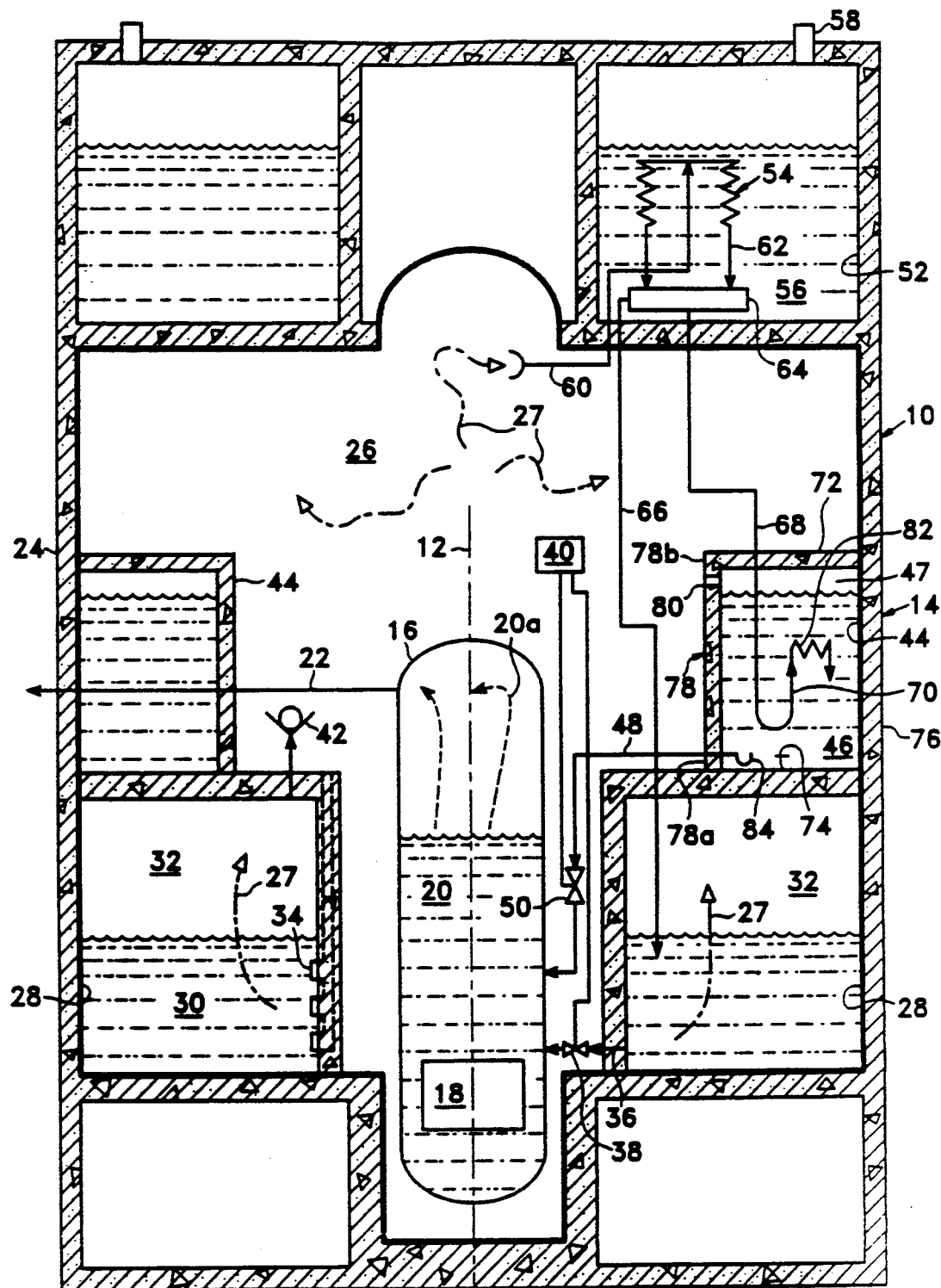
FIG. 1 is a schematic, elevational sectional view of a nuclear reactor building having a pressure suppression system in accordance with one embodiment of the present invention.

Illustrated schematically in FIG. 1 is an exemplary annular reactor building 10 having a longitudinal centerline axis 12. The building 10 includes a pressure suppression system 14 in accordance with an exemplary embodiment of the present invention. The suppression system 14 includes a reactor pressure vessel 16 containing a nuclear reactor core 18 therein submerged in reactor water 20, with the core 18 being conventionally effective for heating the reactor water 20 to generate reactor steam 20a. The steam 20a is conventionally discharged from the pressure vessel 16 through a main steamline 22 joined to a conventional steam turbine-generator (not shown) for conventionally producing electrical power, for example.

An annular containment vessel, or containment 24 is spaced radially outwardly from the pressure vessel 16 and generally coaxially therewith to define a drywell, or plenum, 26 conventionally containing a non-condensable gas, such as nitrogen, shown schematically by the arrows 27. The containment 24 is a conventional concrete structure having a steel liner sized and configured for withstanding elevated pressure for safely containing the pressure vessel 16 and reactor core 18.

An enclosed annular suppression or wetwell pool 28 is disposed in the containment 24 and is conventionally partially filled with water 30 to define a wetwell plenum or airspace 32 thereabove. The wetwell pool 28 provides various conventional functions, including being a heat sink, and includes, for example, conventional drywell-to-wetwell vents 34 which, for example, discharge horizontally for channeling into the wetwell pool 28 any steam released from the pressure vessel 16 during a loss-of-coolant accident (LOCA) for example. Steam channeled into the wetwell pool 28 through the vents 34 carries with it portions of the non-condensable gas 27 and is suitably quenched therein, with the non-condensable gas 27 then being buoyed upwardly for accumulation in the wetwell plenum 32.

The wetwell pool 28 is typically disposed at least in part at an elevation above the reactor core 18 and includes means for selectively allowing gravity to drain the wetwell pool water 30 into the pressure vessel 16 for ensuring cooling of the reactor core 18 following the LOCA. Such means conventionally includes an outlet line 36 having a conventional valve 38 therein which is operatively connected to a conventional controller 40 for either automatically or manually opening the valve 38 when required. Means are also provided for selectively venting the wetwell plenum 32 into the drywell 26 when the pressure in the wetwell plenum 32 exceeds the pressure in the drywell 26 following the LOCA. Such means include one or more conventional vacuum breakers 42 disposed in flow communication with the wetwell plenum 32. Each vacuum breaker 42 is normally closed when the pressure in the drywell 26 is equal or greater than the pressure in the wetwell plenum 32, and automatically opens under pressure when the pressure in the wetwell plenum 32 is suitably greater than the pressure in the drywell 26 for venting gases from the wetwell plenum 32 into the drywell 26.

The system 14 further includes a conventional Gravity Driven Cooling System (GDCS) pool 44 disposed in the containment 24. The GDCS pool 44 is disposed at an elevation above the reactor core 18 and the wetwell pool 28, and is partially filled with water 46 to define a GDCS plenum 47 thereabove. Means are also provided for selectively channeling or draining by gravity the GDCS pool water 46 into the pressure vessel 16 for cooling the reactor core 18 following the LOCA in a conventional manner. Such means include a conventional outlet line 48 and valve 50 therein disposed in flow communication between the GDCS pool 44 and the pressure vessel 16, with the valve 50 being operatively joined to the controller 40 so that it may be conventionally opened when required for allowing the GDCS pool water 46 to flow by gravity into the pressure vessel 16.

A conventional annular isolation pool 52 is disposed in the reactor building 10 above the containment 24 and at an elevation above the GDCS pool 44 as part of a conventional Passive Containment Cooling System (PCCS). The isolation, or PCCS, pool 52 contains a preferably vertically extending heat exchanger, also referred to as a PCCS condenser 54, submerged in isolation water 56. The isolation pool 52 includes one or more vents 58 to atmosphere outside the containment 24 and building 10 for venting the airspace above the isolation pool water 56 for discharging heat therefrom upon use of the PCCS condenser 54.

The PCCS condenser 54 is conventional and includes an inlet line 60 preferably disposed in direct flow communication with the drywell 26 by having an open end disposed therein for receiving the non-condensable gas 27 along with any steam released from the pressure vessel 16 into the drywell 26 following the LOCA. In the event of a LOCA, steam is released into the drywell 26 and has a pressure greater than the pressure within the wetwell plenum 32. The steam will, therefore, also flow into the inlet line 60 and carry with it the non-condensable gas 27 originally contained in the drywell 26. The steam is then conventionally cooled in the tubes of the PCCS condenser 54 by the isolation pool water 56, with the heat liberated therefrom being vented through the vent 58 to the atmosphere, and the resulting condensate therefrom being discharged from the PCCS condenser 54 through one or more outlet lines 62.

A conventional collector chamber, or simply collector 64 is disposed in flow communication with the condenser outlet line 62 and has a gas vent line 66 conventionally disposed in flow communication with the wetwell pool 28, and further has a liquid condensate drain line 68 conventionally disposed in flow communication with the GDCS pool 44. The drain line 68 has a conventional U-shaped distal end 70 preferably disposed in the GDCS pool 44, although it could also be external thereof, submerged in the pool water 46 for forming a conventional water trap or loop seal, also designated 70. The loop seal 70 allows discharge of the condensate from the collector 64 into the GDCS pool 44 and restricts backflow through the drain line 68 and upwardly toward the collector 64.

In conventional operation, steam released into the drywell 26 following the LOCA is channeled through the vents 34 into the wetwell pool 28 for condensing, and through the inlet line 60 to the PCCS condenser 54 which removes heat therefrom and forms the condensate carried through the outlet line 62 into the collector 64. The non-condensable gas 27 carried with the steam through the PCCS condenser 54 is separated in the collector 64, with the separated non-condensable gas 27 being vented through the vent line 66 into the wetwell pool 28 wherein it accumulates in the wetwell plenum 32 above the wetwell water 30. The condensate from the collector 64 is discharged through the drain line 68 into the GDCS pool 44. The non-condensable gas 27 carried into the wetwell pool 28 through the vents 34 is buoyed upwardly therein and accumulates in the wetwell plenum 32.

As the non-condensable gas 27 accumulates in the wetwell plenum 32, the pressure therein increases until the PCCS condenser 54 condenses steam faster than it is released from the pressure vessel 16. At such time, the pressure within the drywell 26 will fall below that of the pressure in the wetwell plenum 32 which will cause the vacuum breakers 42 to open and return a portion of the non-condensable gas 27 from the wetwell plenum 32 to the drywell 26. However, this gas 27 will then be allowed to flow again into the PCCS condenser 54 and lower its effectiveness until the steam being released into the drywell 26 again increases the pressure therein above that of the wetwell plenum 32, at which time the vacuum breakers 42 will close and the cycle will be repeated with the non-condensable gas 27 being vented from the PCCS condenser 54 into the wetwell plenum 32, wherein it again accumulates with rising pressure.

This operation of continually returning the non-condensable gas 27 to the wetwell plenum 32 results in a relatively high overall pressure in the containment 24, especially in the wetwell plenum 32. Furthermore, incremental heating of the top layer of the wetwell pool water 30 occurs each time the non-condensable gas 27 is vented from the PCCS condenser 54 into the wetwell plenum 32, and any small steam leakage through the vacuum breakers 42 and into wetwell plenum 32 also causes the pressure of wetwell plenum 32 to rise, which in turn will cause pressure in the containment 24 to slowly rise.

The size of the wetwell plenum 32 is predetermined to ensure a suitable volume of airspace therein for accumulating the non-condensable gas 27 for limiting the pressure rise within the wetwell pool 28, as well as in the drywell 26 and the entire containment 24. However, since the GDCS pool 44 is drained of most if not all of its water 46 following the LOCA, its empty volume may be used to advantage in the pressure suppression system 14 in accordance with the present invention for providing airspace volume in addition to the wetwell plenum 32 in which the non-condensable gas 27 may accumulate following the LOCA. A conventional GDCS pool is either open at its top or includes a vent at its top in direct flow communication with the drywell 26, and, therefore, following draining of the GDCS pool during the LOCA, the empty volume of the GDCS pool merely becomes an extension of the drywell 26 which backfills with the drywell gas mixture at about the same pressure thereof. In order to effectively use the drained GDCS pool 44 for suppressing pressure in accordance with the present invention, it is enclosed as illustrated in FIG. 1 and has a top 72, a bottom 74, an outer sidewall 76, and an inner sidewall 78. The inner sidewall 78 faces inwardly toward the drywell 26 and is suitably sealingly joined at its bottom end 78a to the pool bottom 74 and sealingly joined at its top end 78b to the pool top 72. In this way, the enclosed GDCS pool 44 is isolated from the drywell 26 and may be further configured to trap the non-condensable gas 27 therein as desired below. In the exemplary embodiment illustrated in FIG. 1, at least two identical GDCS pools 44 are used.

Figure 2:
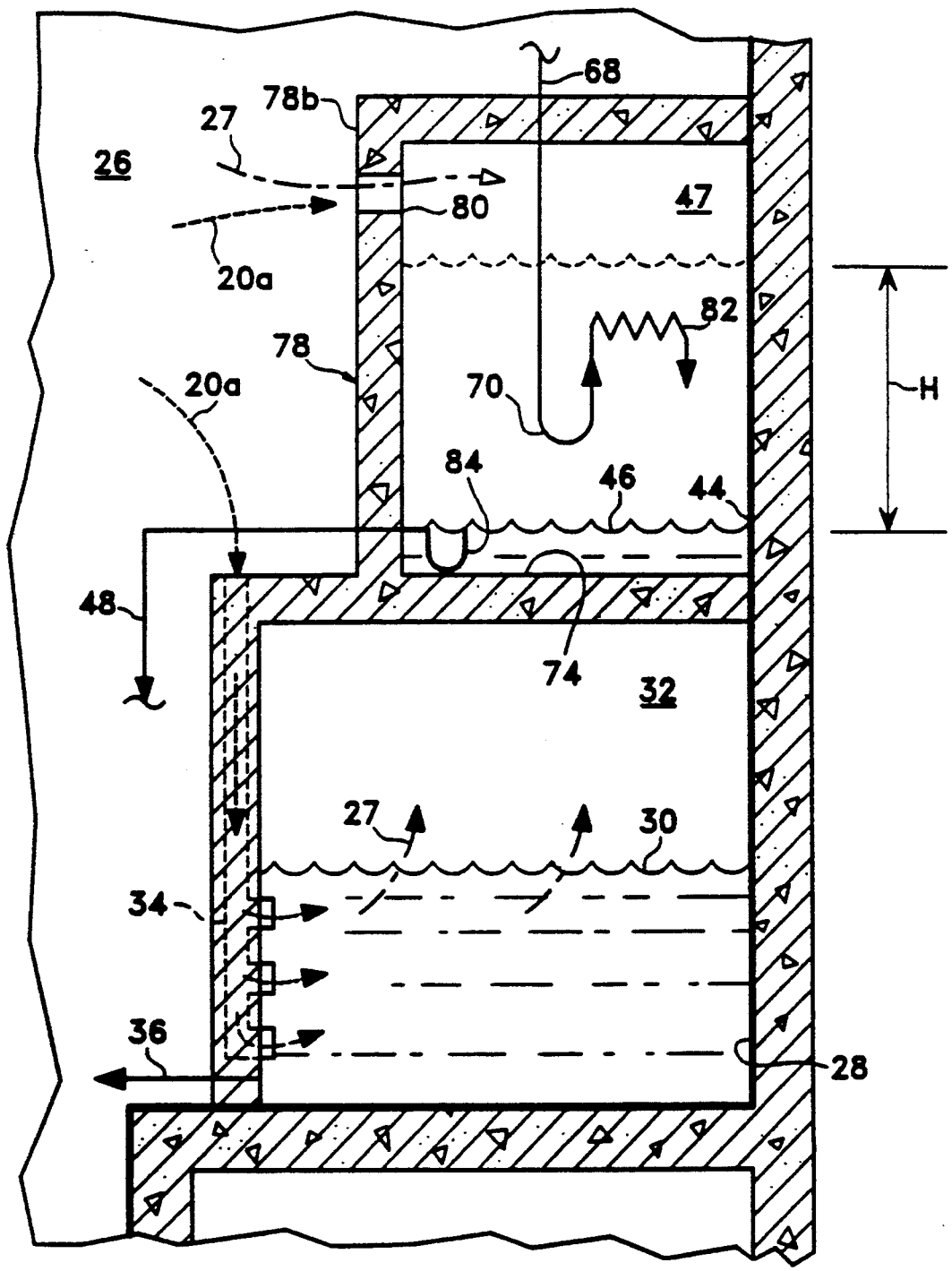
FIG. 2 is an enlarged view of a portion of the reactor building illustrated in FIG. 1 and showing a gravity driven cooling system (GDCS) pool disposed above a wetwell pool in a containment vessel and including a steam condenser in accordance with the present invention.

Since the GDCS pool 44 is now isolated from the drywell 26, after it is drained of its water 46 following the LOCA the enlarged airspace of the GDCS plenum 47 may be used in accordance with the present invention for providing additional volume within the containment 24 for accumulating the non-condensable gas 27 from the drywell 26 for suppressing pressure in the drywell 26. FIG. 1 illustrates the GDCS pools 44 filled to their highest level prior to the LOCA, and FIG. 2 illustrates one of the GDCS pools 44 drained to its lowest level at the location of the outlet line 48. The vertical height H illustrated in FIG. 2 represents the additional volume created in the GDCS pool 44 between its full (shown in phantom) and empty conditions.

More specifically, the pressure suppression system 14 further includes one or more plenum inlets 80 in the exemplary form of apertures through the top of the inner sidewall 78 which are predeterminedly sized for channeling the steam 20a and non-condensable gas 27 from the drywell 26 following the LOCA directly into the GDCS plenum 47. And, means in the exemplary form of a condenser or heat exchanger 82 are disposed inside the plenum 47 for condensing the steam 20a channeled therein through the plenum inlet 80 following draining of the GDCS pool 44 for drawing in additional portions of the steam 20a and non-condensable gas 27. This provides one-way forward flow or inflow through the inlet 80 into the plenum 47 to trap therein the non-condensable gas 27 carried with the steam 20a from the drywell 26 for accumulation therein to suppress pressure in the drywell 26.

Since the steam 20a carried through the plenum inlet 80 into the plenum 47 is hot, by utilizing the condenser 82 for cooling the steam 20a it will condense with an accompanying partial reduction in pressure which will establish a continuing inflow current of the steam/gas mixture from the drywell 26 into the plenum 47 with an attendant accumulation of the non-condensable gas 27 in the plenum 47 and the condensate falling to the bottom of the GDCS pool 44. Accordingly, as the steam 20a is drawn into the plenum 47 by the partial vacuum created by the condensation thereof, portions of the non-condensable gas 27 are removed from the drywell 26 and trapped in the plenum 47. By ensuring that no readily available outlet pathway is provided to return the non-condensable gas 27 into the drywell 26, that gas will be permanently trapped within the plenum 47 as long as the steam 20a is being channeled through the inlet 80, thusly reducing or suppressing pressure within both the drywell 26 and the wetwell plenum 32.

In an exemplary embodiment, the wetwell plenum 32 has an airspace volume of about 3,300 cubic meters, and the empty GDCS plenum 47 has an airspace volume of about 1,000 cubic meters. By utilizing the GDCS plenum 47 to augment the wetwell plenum 32 within the containment vessel 24, the total space available for accumulating the non-condensable gas 27 is increased by about 30%, which correspondingly decreases the pressure of the non-condensable gases 27 within this airspace by about 30%. Accordingly, the containment vessel 24 may be designed for the reduced pressure, which saves cost, or an enhanced pressure margin may be obtained for improved safety of operation.

By fully enclosing the GDCS pool 44 and plenum 47 and then draining by gravity the pool water 46 into the pressure vessel 16 following the LOCA, the additional air space volume thereof may be utilized for suppressing pressure. The plenum inlet 80 allows channeling of the steam 20a released into the drywell 26 following the LOCA directly into the plenum 47, and trapping and accumulation in the plenum 47 of the non-condensable gas 27 carried therein with the steam 20a from the drywell 26 is effected to suppress pressure in the drywell 26 as well as in the wetwell plenum 32. By condensing inside the plenum 47 the steam 20a channeled therein from the drywell 26, additional portions of the steam 20a and the non-condensable gas 27 are drawn therein from the drywell 26 and thereby prevent escape of the non-condensable gas 27 from the plenum 47 back through the plenum inlet 80. As long as suitable condensation of the steam 20a is effected in the plenum 47, a continuous inflow of the steam 20a and the non-condensable gas 27 will occur.

But for the plenum inlet 80, the only other low passage into the GDCS pool 44 or plenum 47 is the outlet line 48 which is used to initially drain the water 46 from the pool 44. In order to effectively trap the non-condensable gas 27 within the plenum 47, means in the exemplary form of a second U-shaped water trap or loop seal 84 are provided for preventing escape of the non-condensable gas 27 from the plenum 47 through the outlet line 48. The outlet line 48 is disposed closely adjacent to the pool bottom 74 through the inner sidewall 78, with the water trap 84 being joined thereto and having a suitable vertical extent for providing an effective gas seal to prevent escape of the non-condensable gas 27 therethrough. Once the pool 44 is drained, the outlet line 48, but for the water trap 84 provides a direct outlet flowpath therefrom, which in the event of a break in the outlet pipe 48 itself, would provide a discharge flowpath back into the drywell 26. The water trap 84 remains filled with water from the pool 44 upon draining of the pool 44 and thereby provides an effective gas seal for preventing escape of the non-condensable gas 27 therethrough. The water trap 84 is preferably disposed inside the GDCS pool 44 as shown, although it could also be disposed externally thereof.

The condenser 82 may take any desirable configuration and may use any suitable source for providing a cooling fluid therethrough for condensing the steam 20a within the plenum 47. In the preferred embodiment of the invention as illustrated in FIGS. 1 and 2, the condenser 82 is preferably joined to the drain line 68 for using the relatively cool condensate from the PCCS condenser 54 for cooling the steam 20a within the plenum 47. In this way the passively generated condensate in the condenser 54 is channeled through its outlet line 62 and through the drain line 68 into the substantially empty GDCS pool 44 (see FIG. 2) for condensing the steam 20a therein also passively. The condenser 82 is initially submerged in the GDCS pool 44 prior to the LOCA, but after draining of the pool 44 following the LOCA, condenser 82 before is exposed to the air space in the now enlarged plenum 47. The steam 20a channeled through the plenum inlet 80 by natural circulation flows over the condenser 82 and is cooled thereby, with condensate therefrom falling by gravity to the pool bottom 74.

Figure 3:
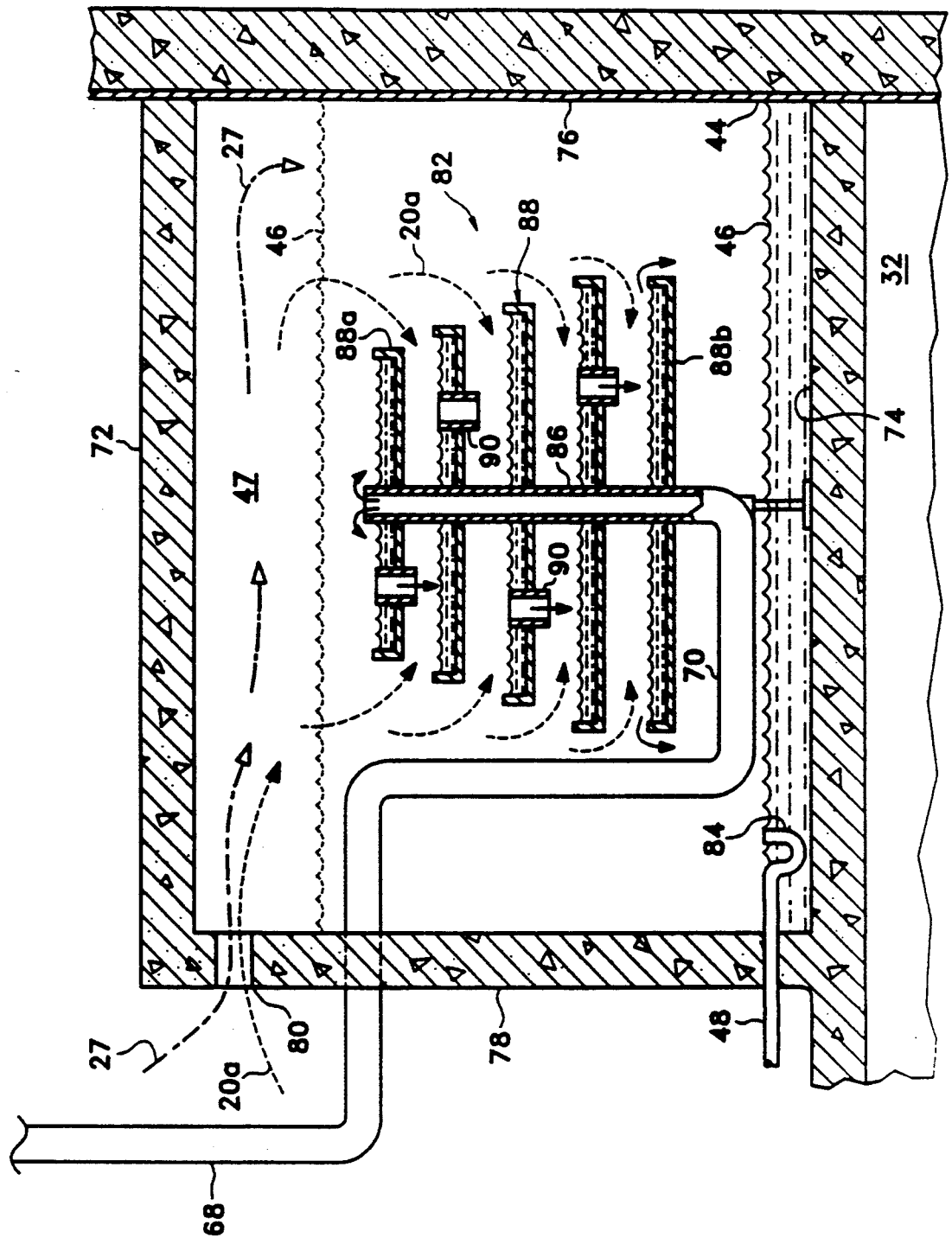
FIG. 3 is an enlarged view of the GDCS pool illustrated in FIG. 2 showing a steam condenser in accordance with an exemplary embodiment of the present invention.

Illustrated in FIG. 3 is an exemplary embodiment of the condenser 82 within the enlarged GDCS plenum 47. In this embodiment, the U-shaped loop seal 70 at the distal end of the drain line 68 includes a vertically extending riser 86 in the form of a pipe for discharging the condensate from the drain line 68 upwardly into the condenser 82. Since the condensate from the PCCS condenser 54 (see FIG. 1) is preferably being used to condense the steam 20a in the plenum 47 as shown in FIG. 3, the condenser 82 preferably includes a plurality of flow spreaders in the exemplary form of shallow trays 88 disposed in flow communication with the riser 86 for receiving the condensate therefrom and spreading the condensate for increasing surface area of contact thereof with the steam 20a channeled into the plenum 47 for the condensation thereof. Since the condenser 82 is passive in the preferred embodiment illustrated in FIG. 3, the several trays 88 are preferred to enhance condensation and minimize undesirable thermal stratification therein. It is conventionally known that adding hot water into the top of a stagnant pool effects thermal stratification therein with the hottest temperatures at the top and the coldest temperatures at the bottom. Thermal stratification is undesirable since it decreases the ability to condense the steam 20a which necessarily flows along the top surface of pool water.

As shown in FIG. 3, the trays 88 are substantially flat plates with short sidewalls for containing the relatively shallow level of water therein to maximize the surface area available for condensation of the steam 20a as it flows thereover. The trays 88 include a top tray 88a disposed at the top of the riser 86 for first receiving the condensate therefrom and is suitably filled thereby. Overflow of the condensate from the top tray 88 is then channeled therefrom downwardly in turn to succeeding, lower ones of the trays 88 and finally to a bottom tray 88b. The condensate may overflow each of the trays 88 by overflowing its outer perimeter, such as illustrated for the bottom tray 88b, but in the preferred embodiment of the present invention respective transfer tubes 90 are utilized for more accurately controlling the depth of the liquid in each of the trays 88. In the exemplary embodiment illustrated in FIG. 3, the bottom tray 88b is imperforate without a transfer tube 90 and each of the trays 88 above the bottom tray 88b includes a respective one of the transfer tubes 90 extending vertically therethrough. Each of the tubes 90 has a top inlet predeterminedly spaced upwardly from the tray bottom to control the level of the liquid in the tray 88, with the inlet of the tube 90 receiving fluid overflow from the tray 88 which is channeled downwardly through the tube 90 and out a bottom outlet thereof into a succeeding lower one of the trays 88 disposed therebelow. In this way, the top tray 88a receives first the condensate from the riser 86, with the overflow from the top tray 88a falling into the next lower tray 88, and in turn to the next lower trays 88 until finally falling by gravity into the bottom tray 88b from which it will overflow the sides thereof and join the residual pool water 46.

In the exemplary embodiment illustrated in FIG. 3, the trays 88 are preferably fixedly joined to the riser 86 and supported thereby. In this way the loop seal 70 is used for dual purposes: firstly, for providing a water trap to prevent backflow through the drain line 68; and secondly for supporting the trays 88. Of course, the trays 88 could be supported in alternate fashions as desired.

Although the condenser 82 is in the preferred form of the vertically spread apart trays 88, in alternate embodiments of the present invention the condenser 82 may take other conventional forms including wicks, meshes, screens, plates, pipe arrays, rod arrays, channel arrays, spray nozzles, spray cones, and other configurations effective for spreading the condensate received from the riser 86 for maximizing surface area to condense the steam 20a within the plenum 47.

Of course, during normal operation prior to the LOCA, the GDCS pool 44 is filled to its normally high level of water with the condenser 82 being submerged therein. When required, the GDCS pool 44 may be drained into the pressure vessel 16 following the LOCA, thusly uncovering the condenser 82 and providing the increased volume of the plenum 47 in which the non-condensable gas 27 may be received and trapped in accordance with the present invention. By trapping a portion of the non-condensable gas 27 in the now drained GDCS plenum 47, less non-condensable gas accumulates in the wetwell plenum 32, reducing the pressure therein. And, peak pressure in the drywell 26 will also be lowered by trapping the non-condensable gas 27 within the plenum 47 and preventing its return to the drywell 26. Furthermore since the PCCS operates on the pressure differential between the drywell 26 and the wetwell plenum 32 for channeling the steam 20a through the PCCS condenser 54, an inherent limit on the drywell-to-wetwell pressure is provided, with a reduction in the pressure of the wetwell plenum 32 providing a corresponding reduction in pressure of the drywell 26.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A pressure suppression system for incorporation in a boiling water reactor having a containment vessel, a reactor pressure vessel surrounded by said containment vessel with a drywell therebetween and a nuclear fuel core arranged inside said reactor pressure vessel, said drywell being filled during normal operation with non-condensable gas, comprising:
   a gravity-driven cooling system ("GDCS") pool containing water having an elevation which is higher than the elevation of said fuel core, gravity-driven channeling means by which water can flow from said GDCS pool to said reactor pressure vessel, valve means for opening said flow path from said GDCS system pool to said reactor pressure vessel to allow gravity-driven water flow in response to an emergency condition, a condensate inlet flow path for receiving condensate from outside said GDCS pool, a steam inlet for channeling gases from said drywell into a GDCS plenum above the water contained by said GDCS pool, means for condensing steam arranged inside said GDCS pool, and means for preventing escape of non-condensable gas from said GDCS plenum through said gravity-driven channeling means.

2. A system according to claim 1 further comprising:
   an isolation pool disposed above said containment vessel at an elevation above said GDCS pool and including a condenser submerged in isolation water therein and disposed in flow communication with said drywell for receiving therefrom said steam and non-condensable gas; and
   a drain line disposed in flow communication between said condenser and said condensing means therein for channeling condensate formed from condensing said steam in said condenser into said condensing means for condensing said steam channeled into said GDCS plenum through said inlet.

3. A system according to claim 2 wherein said drain line includes a U-shaped loop seal initially submerged in said GDCS pool prior to draining thereof, said loop seal having an elongate riser for discharging said condensate from said drain line into said condensing means for condensing said steam channeled into said GDCS plenum.

4. A system according to claim 1 wherein:
   said gravity-driven channeling means include an outlet line disposed adjacent to a bottom of said GDCS pool; and
   said escape preventing means include a U-shaped water trap disposed at an end of said outlet line in said GDCS pool for preventing escape of said non-condensable gas from said GDCS plenum through said outlet line.

5. A system according to claim 3 wherein said condensing means inside said GDCS plenum include a plurality of flow spreaders disposed in flow communication with said riser for receiving said condensate therefrom and spreading said condensate for increasing surface area of contact thereof with said steam channeled into said GDCS plenum for condensation thereof.

6. A system according to claim 5 wherein said flow spreaders include a plurality of vertically spaced apart trays, with a top one of said trays first receiving said condensate from said riser and channeling said condensate therefrom downwardly in turn to succeeding lower ones of said trays to a bottom one thereof.

7. A system according to claim 6 wherein each of said trays above said bottom tray includes a transfer tube extending vertically therethrough, each tube having a top inlet spaced at a predetermined height above a bottom of said tray for receiving fluid overflow therefrom and channeling said overflow downwardly through said tube and through an outlet thereof onto a lower one of said trays.

8. A system according to claim 6 wherein said trays are fixedly joined to said riser and supported thereby.

9. A method for suppressing pressure inside a drywell of a nuclear reactor having a containment vessel, a reactor pressure vessel surrounded by said containment vessel with said drywell therebetween, said drywell being filled during normal operation with non-condensable gas, a nuclear fuel core arranged inside said reactor pressure vessel, and a gravity-driven cooling system ("GDCS") pool containing water having an elevation which is higher than the elevation of said fuel core, comprising the steps of:
   draining GDCS pool water via a drainage path into said reactor pressure vessel by gravity in response to an emergency condition which results in steam being released from said reactor pressure vessel into said drywell;

channeling released steam and non-condensable gas via a flow path from said drywell into a GDCS plenum above residual water in said drained GDCS pool; and condensing steam inside said GDCS plenum for drawing in additional steam and non-condensable gas from said drywell and thereby preventing escape of non-condensable gas from said GDCS plenum.

10. A method according to claim 9 wherein a passive containment cooling system (PCCS) condenser is disposed in an isolation pool above said containment vessel in flow communication with said drywell for receiving therefrom steam and non-condensable gas, and in flow communication with said GDCS pool to discharge thereto condensate formed from cooling steam in said PCCS condenser, further comprising the step of using said condensate from said PCCS condenser to cool and thereby condense steam being channeled into said GDCS plenum directly from said drywell.

11. A method according to claim 9, further comprising the step of trapping water in said drainage path to prevent the flow of non-condensable gas from said GDCS plenum to said reactor pressure vessel.

12. In a passive emergency cooling system of a boiling water reactor having a primary containment vessel, a reactor pressure vessel surrounded by said primary containment vessel with a drywell therebetween, a nuclear fuel core arranged inside said reactor pressure vessel, and a suppression pool containing water located inside said primary containment vessel and outside said reactor pressure vessel, said passive emergency cooling system comprising:

a gravity-driven cooling system pool containing water having an elevation which is higher than the elevation of said fuel core, a drainage path by which water can flow by gravity from said gravity-driven cooling system pool to said reactor pressure vessel, valve means for opening said flow path from said gravity-driven cooling system pool to said reactor pressure vessel to allow gravity-driven water flow in response to an emergency condition, a condensate inlet flow path for receiving condensate from outside said gravity-driven cooling system pool, a first loop seal in flow communication with said condensate inlet flow path, and a steam inlet for channeling steam from said drywell into a gravity-driven cooling system plenum above the water contained by said gravity-driven cooling system pool; and a condenser pool containing water, a condenser submerged in said water in said condenser pool, a condenser inlet flow path for coupling steam from said drywell into said condenser, a first condenser outlet flow path for coupling non-condensable gases from said condenser into said suppression pool, and a second condenser outlet flow path for coupling condensate from said condenser into said condensate inlet flow path in said gravity-driven cooling system pool, the improvement wherein means for condensing steam are arranged inside said gravity-driven cooling system pool, said steam condensing means receiving condensate via said condensate inlet flow path and said first loop seal, and wherein said drainage path comprises a second loop seal in flow communication with water in said gravity-driven cooling system for preventing the flow of non-condensable gas from said gravity-driven cooling system plenum to said reactor pressure vessel.

13. The system according to claim 12, wherein each of said first and second loop seals is a U-shaped water trap.

14. The system according to claim 12, wherein said first loop seal is a U-shaped water trap having an elongated riser for discharging condensate into said condensing means.

15. The system according to claim 14, wherein said condensing means comprises a plurality of flow spreaders disposed in flow communication with said riser for spreading condensate discharged from said riser to increase a surface area of contact between discharged condensate and steam inside said gravity-driven cooling system plenum.

16. The system according to claim 15, wherein each of said flow spreaders comprises a horizontally disposed tray, said trays being arranged in a vertical stack.

17. The system according to claim 16, wherein each of said trays, with the exception of a bottommost tray, has overflow means positioned so that water overflowing from one tray falls into the next lower tray.

18. The system according to claim 16, wherein said trays are supported by said riser.

* * * * *